US012691880B2

(12) United States Patent (10) Patent No.: US 12,691,880 B2
Lee et al. (45) Date of Patent: Jul. 28, 2026

(54) VEHICLE FOR PERFORMING MINIMAL RISK MANEUVER AND METHOD FOR OPERATING THE SAME

(71) Applicants:Hyundai Motor Company, Seoul (KR); Kia Corporation, Seoul (KR)

(72) Inventors: Jong Hyuck Lee, Hwaseong-Si (KR); Jong Sung Park, Hwaseong-Si (KR); Chan Jong Jang, Daegu (KR); Young Bin Min, Busan (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 161 days.

(21) Appl. No.: 18/374,333

(22) Filed: Sep. 28, 2023

(65) Prior Publication Data

US 2024/0109539 A1 Apr. 4, 2024

(30) Foreign Application Priority Data

Sep. 30, 2022 (KR) ........................ 10-2022-0125176
Aug. 31, 2023 (KR) ........................ 10-2023-0115649

(51) Int. Cl.
*B60W 30/18* (2012.01)
*B60W 50/00* (2006.01)
*B60W 60/00* (2020.01)
(52) U.S. Cl.
CPC .. *B60W 30/18163* (2013.01); *B60W 50/0097* (2013.01); *B60W 60/001* (2020.02); *B60W 2554/4041* (2020.02)

(58) Field of Classification Search
CPC ....... B60W 30/18163; B60W 50/0097; B60W 60/001; B60W 2554/4041;
(Continued)

(56) References Cited

U.S. PATENT DOCUMENTS 9,315,178 B1 * 4/2016 Ferguson ................ B60T 8/171
9,523,984 B1 * 12/2016 Herbach .............. B60W 10/18
(Continued)

FOREIGN PATENT DOCUMENTS

CN 118025218 A * 5/2024 .......... B60W 60/007
DE 102019215815 A1 * 5/2020 ........ B60W 50/0098
(Continued)

OTHER PUBLICATIONS

DE-102019215815-A1 machine trnaslation (Year: 2019).*
CN-118025218-A machine translation (Year: 2024).*
May 31, 2024—(EP) European Search Report—App 23200666.8.

*Primary Examiner* — Angelina M Shudy
(74) *Attorney, Agent, or Firm* — Banner & Witcoff, Ltd.

(57) ABSTRACT
A vehicle includes at least one sensor, a controller configured to control operations of the vehicle; and a processor configured to be electrically connected to the at least one sensor and the controller, the processor configured to detect, based on surrounding environment information and vehicle state information collected from the at least one sensor, an event associated with a stop, identify, by the at least one sensor and based on the detected event, an area for the vehicle to stop, determine, based on a size of the identified area, a stop type, and cause, by the controller and based on the determined stop type, the vehicle to stop in the identified area.

20 Claims, 11 Drawing Sheets

(58) Field of Classification Search
CPC ......... B60W 2540/26; B60W 2552/00; B60W 2556/50; B60W 30/0956; B60W 60/0016; B60W 30/181; B60W 40/02; B60W 60/0018; B60W 2552/20; B60W 2420/403; B60W 2420/408; B60W 2420/54; B60W 2554/404; B60W 2554/80; B60Y 2302/05; G08G 1/00; G05D 1/00; G01C 21/00

See application file for complete search history.

(56) References Cited

U.S. PATENT DOCUMENTS

| | | | | |
|---|---|---|---|---|
| 9,764,640 | B2* | 9/2017 | Matsuno | B62D 6/00 |
| 10,054,947 | B2* | 8/2018 | Mays | B60T 7/18 |
| 10,074,274 | B2* | 9/2018 | Becker | H04W 84/18 |
| 10,282,625 | B1* | 5/2019 | Wengreen | G01C 21/3484 |
| 10,331,142 | B2* | 6/2019 | Bar-Tal | G05D 1/0212 |
| 10,351,134 | B2* | 7/2019 | Nakamura | B60W 30/0956 |
| 10,481,613 | B2* | 11/2019 | Schroeder | B60W 50/14 |
| 10,621,452 | B2* | 4/2020 | Efland | G05D 1/247 |
| 10,725,474 | B2* | 7/2020 | Otsuka | B60W 50/029 |
| 10,962,973 | B2* | 3/2021 | Kazemi | B60W 60/0027 |
| 11,008,009 | B2* | 5/2021 | Oguro | B60W 30/162 |
| 11,027,722 | B2* | 6/2021 | Mizuno | B60W 30/00 |
| 11,048,260 | B2* | 6/2021 | Hudecek | G05D 1/0088 |
| 11,193,784 | B2* | 12/2021 | Patel | G06F 3/04845 |
| 11,334,081 | B2* | 5/2022 | Maus | G05D 1/0214 |
| 11,493,353 | B1* | 11/2022 | Konala | G05D 1/0291 |
| 11,514,733 | B1* | 11/2022 | Krotosky | H04L 67/12 |
| 11,541,910 | B1* | 1/2023 | Ganguli | B60W 30/18163 |
| 11,667,280 | B2* | 6/2023 | Lee | B60N 2/0276 701/26 |
| 11,787,440 | B2* | 10/2023 | Zhu | B60W 30/0956 701/23 |
| 11,927,959 | B2* | 3/2024 | Yoshizaki | B60W 30/10 |
| 12,097,848 | B2* | 9/2024 | Motoyama | B60W 30/095 |
| 12,233,872 | B2* | 2/2025 | Chikamori | B60W 30/182 |
| 12,296,852 | B1* | 5/2025 | Zwiener | B60W 60/00253 |
| 12,319,276 | B2* | 6/2025 | Ishida | B60W 40/105 |
| 12,351,168 | B2* | 7/2025 | Jang | B60W 60/0011 |
| 12,517,506 | B2* | 1/2026 | Ishida | B60W 50/0098 |
| 2002/0198644 | A1* | 12/2002 | Obata | B62D 7/159 180/443 |
| 2012/0306664 | A1* | 12/2012 | Geter | G08G 1/166 340/903 |
| 2013/0338878 | A1* | 12/2013 | Fritz | B60W 10/20 701/1 |
| 2014/0024494 | A1* | 1/2014 | Inoue | B60W 50/10 477/94 |
| 2015/0006012 | A1* | 1/2015 | Kammel | B60W 30/06 701/23 |
| 2015/0345961 | A1* | 12/2015 | Oooka | B60W 30/143 701/25 |
| 2015/0345964 | A1* | 12/2015 | Oooka | B60W 30/143 701/41 |
| 2016/0231746 | A1* | 8/2016 | Hazelton | G05D 1/0274 |
| 2016/0297431 | A1* | 10/2016 | Eigel | B60W 30/18109 |
| 2016/0368491 | A1 | 12/2016 | Hauler et al. | |
| 2017/0008528 | A1* | 1/2017 | Nakatsuka | B60W 50/10 |
| 2017/0108865 | A1* | 4/2017 | Rohde | B60W 60/007 |
| 2017/0113694 | A1* | 4/2017 | Nakatsuka | B60W 30/18109 |
| 2017/0192429 | A1* | 7/2017 | Tseng | B60W 60/007 |
| 2017/0212513 | A1* | 7/2017 | Iida | B60W 60/0011 |
| 2017/0297567 | A1 | 10/2017 | Matsumura | |
| 2017/0297569 | A1* | 10/2017 | Nilsson | B60K 28/10 |
| 2018/0029604 | A1* | 2/2018 | Niino | B60W 30/181 |
| 2018/0147988 | A1* | 5/2018 | Lee | B60W 50/14 |
| 2018/0197299 | A1* | 7/2018 | Sugita | G06V 30/274 |
| 2018/0292829 | A1* | 10/2018 | Li | G06Q 10/02 |
| 2018/0334161 | A1* | 11/2018 | Mizuno | B60W 30/00 |
| 2018/0336007 | A1* | 11/2018 | Li | G10L 15/22 |
| 2019/0039613 | A1* | 2/2019 | Lee | B60W 30/0956 |
| 2019/0056738 | A1* | 2/2019 | Prasad | B60W 60/0015 |

| | | | | |
|---|---|---|---|---|
| 2019/0080609 | A1* | 3/2019 | Mizoguchi | B62D 1/286 |
| 2019/0135291 | A1* | 5/2019 | Sim | B60W 10/188 |
| 2019/0196486 | A1* | 6/2019 | Ishikawa | B60W 40/04 |
| 2019/0276013 | A1* | 9/2019 | Kim | B60W 30/09 |
| 2019/0315346 | A1* | 10/2019 | Yoo | G05D 1/0061 |
| 2019/0317492 | A1* | 10/2019 | Choi | B60W 30/09 |
| 2019/0377351 | A1* | 12/2019 | Phillips | B60W 50/00 |
| 2020/0070824 | A1* | 3/2020 | Sugano | B60W 10/20 |
| 2020/0086860 | A1* | 3/2020 | Oguro | B60W 30/09 |
| 2020/0094850 | A1* | 3/2020 | Chi | G05D 1/617 |
| 2020/0101970 | A1* | 4/2020 | Reinert | B60T 7/12 |
| 2020/0118441 | A1* | 4/2020 | Han | G06N 20/00 |
| 2020/0159234 | A1* | 5/2020 | Ohara | B60W 60/00274 |
| 2020/0247396 | A1* | 8/2020 | Kim | B62D 15/0285 |
| 2020/0254927 | A1* | 8/2020 | Motegi | G06V 20/58 |
| 2020/0257299 | A1* | 8/2020 | Wang | G08G 1/167 |
| 2020/0276973 | A1* | 9/2020 | Meijburg | G08G 1/0965 |
| 2020/0310443 | A1* | 10/2020 | Kwon | G05D 1/0214 |
| 2020/0331493 | A1* | 10/2020 | Wu | B60W 60/0011 |
| 2021/0053567 | A1* | 2/2021 | Dyer | B60W 30/18009 |
| 2021/0146953 | A1* | 5/2021 | Horita | G08G 1/167 |
| 2021/0149395 | A1* | 5/2021 | Jonsson | B60W 50/082 |
| 2021/0197831 | A1* | 7/2021 | Choi | B60W 40/09 |
| 2021/0229658 | A1* | 7/2021 | Tsuji | B60W 60/0016 |
| 2021/0229702 | A1* | 7/2021 | Tsuji | B60W 60/0016 |
| 2021/0229705 | A1* | 7/2021 | Tsuji | B60W 10/18 |
| 2021/0294336 | A1* | 9/2021 | Maus | G05D 1/0214 |
| 2021/0300434 | A1* | 9/2021 | Nakamura | B60W 30/181 |
| 2022/0063669 | A1* | 3/2022 | Fukushige | B60W 60/00253 |
| 2022/0073097 | A1* | 3/2022 | Sucan | G05D 1/0016 |
| 2022/0135039 | A1* | 5/2022 | Jardine | B60W 30/18163 701/26 |
| 2022/0171977 | A1* | 6/2022 | Oh | B60W 50/0205 |
| 2022/0203987 | A1* | 6/2022 | Kato | B60W 30/12 |
| 2022/0204053 | A1* | 6/2022 | Taniguchi | B60W 40/114 |
| 2022/0258704 | A1* | 8/2022 | Byeon | B60W 30/18036 |
| 2022/0266871 | A1* | 8/2022 | Hayashi | B60W 60/00272 |
| 2022/0306084 | A1* | 9/2022 | Sakaguchi | B60W 20/50 |
| 2022/0340130 | A1* | 10/2022 | Motoyama | G08G 1/165 |
| 2022/0410877 | A1* | 12/2022 | Ishida | B60W 40/12 |
| 2022/0410937 | A1* | 12/2022 | Parasuram | B60W 60/00272 |
| 2023/0099334 | A1* | 3/2023 | Pedersen | B60W 60/0011 701/23 |
| 2023/0122011 | A1* | 4/2023 | Ishimaru | G06V 20/588 348/148 |
| 2023/0132512 | A1* | 5/2023 | Clawson | B60W 60/0027 701/26 |
| 2023/0211824 | A1* | 7/2023 | Sakaguchi | B62D 15/0265 701/41 |
| 2023/0249686 | A1* | 8/2023 | Sugimoto | B60W 50/14 701/70 |
| 2023/0322261 | A1* | 10/2023 | Otsuka | G08G 1/166 701/23 |
| 2023/0347939 | A1* | 11/2023 | Nakano | B60W 60/0015 |
| 2023/0365143 | A1* | 11/2023 | Yumer | B60W 30/12 |
| 2023/0373524 | A1* | 11/2023 | Morita | G01S 13/44 |
| 2023/0382371 | A1* | 11/2023 | Park | B60W 30/08 |
| 2024/0017738 | A1* | 1/2024 | Vozar | B60W 60/00186 |
| 2024/0017749 | A1 | 1/2024 | Um et al. | |
| 2024/0051520 | A1* | 2/2024 | Kim | G01S 13/931 |
| 2024/0199081 | A1* | 6/2024 | Kang | B60W 60/00253 |
| 2024/0296737 | A1* | 9/2024 | Zhou | G08G 1/14 |
| 2024/0375686 | A1* | 11/2024 | Jeyakumaran | H04W 4/40 |
| 2024/0416952 | A1* | 12/2024 | Maniatopoulos | B60W 60/001 |
| 2025/0029398 | A1* | 1/2025 | Kim | G06V 20/586 |
| 2025/0065919 | A1* | 2/2025 | Yu | G07C 5/008 |
| 2025/0074468 | A1* | 3/2025 | Park | B60W 60/0011 |
| 2025/0214574 | A1* | 7/2025 | Park | B60W 60/0015 |
| 2025/0214575 | A1* | 7/2025 | Park | B60W 60/0059 |
| 2025/0214617 | A1* | 7/2025 | Gazepi | B60W 60/0011 |
| 2025/0249934 | A1* | 8/2025 | Park | B60W 60/0018 |
| 2025/0319899 | A1* | 10/2025 | Jang | B60W 60/0015 |

(56) References Cited

U.S. PATENT DOCUMENTS

2025/0326400 A1* 10/2025 Kim ...................... B60K 35/28
2025/0346259 A1* 11/2025 Morse ................... B60W 50/14

FOREIGN PATENT DOCUMENTS

EP           3616961  A1     3/2020
WO        2022092683  A1     5/2022

* cited by examiner 301            305            303

Figure 7:
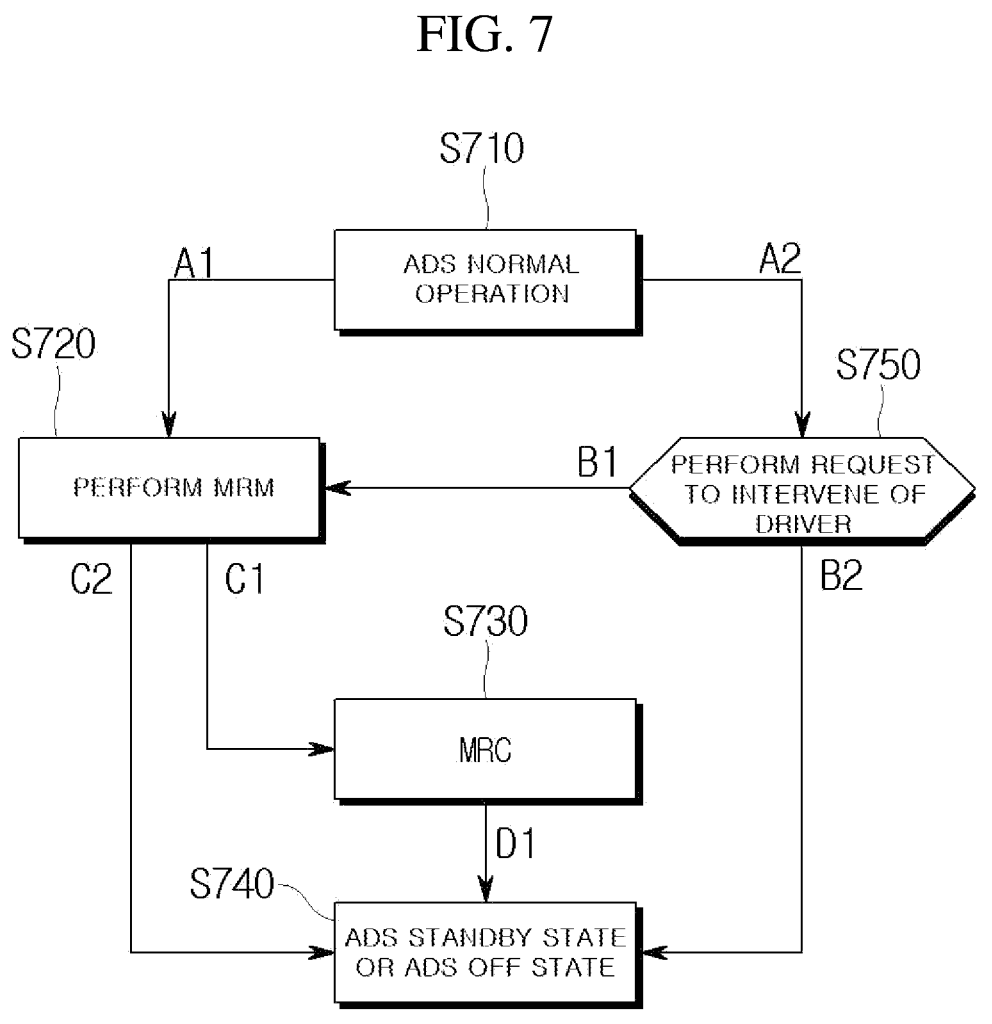

A1     ADS NORMAL OPERATION     A2

S720

S750

PERFORM MRM      B1      PERFORM REQUEST TO INTERVENE OF DRIVER

C2    C1          B2

S730

MRC

D1

S740     ADS STANDBY STATE OR ADS OFF STATE $$W - M_t > W_v$$

$$W - M_t > W_v$$

VEHICLE FOR PERFORMING MINIMAL RISK MANEUVER AND METHOD FOR OPERATING THE SAME

CROSS REFERENCE TO RELATED APPLICATION

The present application claims the benefits of Korean Patent Application No. 10-2022-0125176, filed on Sep. 30, 2022, and Korean Patent Application No. 10-2023-0115649, filed on Aug. 31, 2023. The contents of the foregoing applications are incorporated by reference in their entireties.

FIELD

The present disclosure relates to a vehicle for performing a minimum risk maneuver and a method for operating the same.

BACKGROUND

Advanced driver assistance systems (ADAS) may assist the driving of a driver. The ADAS may have multiple sub-classifications of technologies and provide convenience to the driver. Such ADAS may be also called autonomous driving or autonomous driving system (ADS).

An abnormality may occur in an autonomous driving system while a vehicle performs autonomous driving. The vehicle may be in a dangerous situation if appropriate measures to such abnormality of the autonomous driving system are not performed.

SUMMARY

According to the present disclosure, a vehicle may comprise: at least one sensor; a controller configured to control operations of the vehicle; and a processor electrically connected to the at least one sensor and the controller, wherein the processor is configured to: detect, based on surrounding environment information and vehicle state information collected from the at least one sensor, an event associated with a stop; identify, based on a sensing result of the at least one sensor and based on the detected event, an area for the vehicle to stop, determine, based on a size of the identified area, a stop type; and based on the determined stop type, cause the controller to control the vehicle to stop in the identified area.

The vehicle, wherein: the stop type corresponds to one of: a full-shoulder stop, a half-shoulder stop, a parallel stop, or an oblique stop; or the stop type corresponds to: one of the full-shoulder stop or the half-shoulder stop; and one of the parallel stop or the oblique stop. The vehicle, wherein the processor is further configured to: based on a width of the identified area satisfying a threshold width, determine that the full-shoulder stop corresponds to the stop type, or based on the width of the identified area not satisfying the threshold width, determine that the half-shoulder stop corresponds to the stop type. The vehicle, wherein the processor is further configured to: based on a length of the identified area satisfying a threshold length, determine that the parallel stop corresponds to the stop type, or based on the length of the identified area not satisfying the threshold length, determine that the oblique stop corresponds to the stop type.

The vehicle, wherein the processor is further configured to: based on a width of the identified area satisfying a threshold width and a length of the identified area satisfying a threshold length, determine that the full-shoulder stop and the parallel stop correspond to the stop type, based on the width of the identified area not satisfying the threshold width and the length of the identified area not satisfying the threshold length, determine that the half-shoulder stop and the oblique stop correspond to the stop type, based on the width of the identified area not satisfying the threshold width and the length of the identified area satisfying the threshold length, determine that the half-shoulder stop and the parallel stop correspond to the stop type, or based on the width of the identified area satisfying the threshold width and the length of the identified area not satisfying the threshold length, determine that the full-shoulder stop and the oblique stop correspond to the stop type.

The vehicle, wherein the processor is further configured to: cause the controller to control the vehicle to drive without reversing or stopping until reaching the identified area. The vehicle, wherein the processor is configured to: identify the area by searching for the area within a specified threshold range. The vehicle, wherein the processor is further configured to: prioritize the searching: with a first priority, for an area corresponding to a full-shoulder stop and a parallel stop; and with a second priority, for an area corresponding to a half-shoulder stop, the second priority being lower than the first priority.

The vehicle, wherein the processor is further configured to: predict a size of a portion of a driving lane encroached by the vehicle crossing the driving lane for stopping, and based on the predicted size not satisfying a threshold size, determine that the stop type corresponds to the half-shoulder stop. The vehicle, wherein the processor is configured to: identify the area, based on a prior failed search for a road shoulder area for the vehicle to stop, by searching for the area for the vehicle to make a traffic lane stop.

According to the present disclosure, a method performed by at least one processor of a vehicle, the method may comprise: detecting, based on surrounding environment information and vehicle state information collected from at least one sensor, an event associated with a stop; identifying, based on a sensing result of the at least one sensor and based on the detected event, an area for the vehicle to stop; determining, based on a size of the identified area, a stop type; and causing, based on the determined stop type, a controller to control the vehicle to stop in the identified area.

The method, wherein the determining the stop type comprises: determining that the stop type corresponds to one of a full-shoulder stop, a half-shoulder stop, a parallel stop, or an oblique stop; or determining that the stop type corresponds to: one of the full-shoulder stop or the half-shoulder stop; and one of the parallel stop or the oblique stop. The method, wherein the determining the stop type comprises: based on a width of the identified area satisfying a threshold width, determining that the full-shoulder stop corresponds to the stop type; or based on the width of the identified area not satisfying the threshold width, determining that the half-shoulder stop corresponds to the stop type. The method, wherein the determining the stop type comprises: based on a length of the identified area satisfying a threshold length, determining that the parallel stop corresponds to the stop type; and based on the length of the identified area not satisfying the threshold length, determining that the oblique stop corresponds to the stop type.

The method, wherein the determining the stop type comprises: based on a width of the identified area satisfying a threshold width and a length of the identified area satisfying a threshold length, determining that the full-shoulder stop and the parallel stop correspond to the stop type; based on the width of the identified area not satisfying the threshold width and the length of the identified area not satisfying the threshold length, determining that the half-shoulder stop and the oblique stop correspond to the stop type; based on the width of the identified area not satisfying the threshold width and the length of the identified area satisfying the threshold length, determining that the half-shoulder stop and the parallel stop correspond to the stop type; or based on the width of the identified area satisfying the threshold width and the length of the identified area not satisfying the threshold length, determining that the full-shoulder stop and the oblique stop correspond to the stop type.

The method, wherein the causing the controller to control the vehicle to stop comprises causing the controller to control the vehicle to drive without reversing or stopping until reaching the identified area. The method, wherein the identifying the area comprises searching for the area within a specified threshold range. The method, wherein the searching for the area comprises prioritizing the searching: with a first priority, for an area corresponding to a full-shoulder stop and a parallel stop; and with a second priority, for an area corresponding to a half-shoulder stop, the second priority being lower than the first priority.

The method, wherein the searching with the second priority comprises: predicting a size of a portion of a driving lane encroached by the vehicle crossing the driving lane for stopping; and based on the predicted size not satisfying a threshold size, determining that the stop type corresponds to the half-shoulder stop. The method, wherein the identifying the area comprises identifying the area, based on a prior failed search for a road shoulder area for the vehicle to stop, by searching for the area for the vehicle to make a traffic lane stop.

BRIEF DESCRIPTION OF THE DRAWINGS

FIGS. 3A and 3B show examples of a shoulder area according to various examples of the present disclosure;

FIG. 7 shows an example of showing operations of the vehicle according to various examples of the present disclosure;

DETAILED DESCRIPTION

Figure 1:
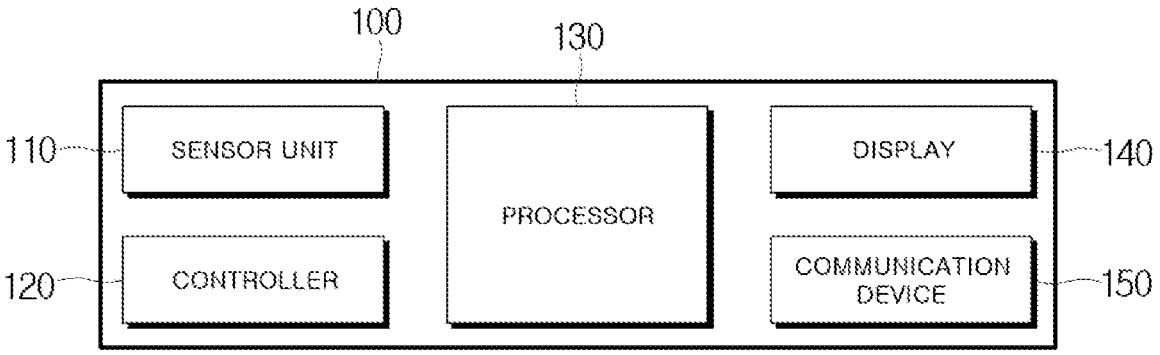
FIG. 1 shows an example of a vehicle according to various examples of the present disclosure.

Hereinafter, certain examples of the present invention will be described in detain with reference to the accompanying drawings.

The configuration of the present disclosure and details of the consequent effect will be more clearly understood by the following detailed description. Prior to the detailed description of the present disclosure, the same components are denoted by the same reference numerals as much as possible even though they are depicted in different drawings. It should be noted that the detailed description will be omitted if the known configurations may make the subject matter of the present disclosure unclear.

Prior to the detailed description of the present disclosure, terms used in the present disclosure may be defined as follows.

A vehicle is equipped with an autonomous driving system (ADS) and thus can be autonomously driven. For example, the vehicle may perform at least one of steering, acceleration, deceleration, lane change, and stopping without a driver's manipulation by the ADS. The ADS may include, for example, at least one of pedestrian detection and collision mitigation system (PDCMS), lane change decision aid system (LCAS), land departure warning system (LDWS), adaptive cruise control (ACC), lane keeping assistance system (LKAS), road boundary departure prevention system (RBDPS), curve speed warning system (CSWS), forward vehicle collision warning system (FVCWS), and low speed following (LSF).

A driver is a person who uses a vehicle and is provided with a service of an autonomous driving system.

A vehicle control authority controls at least one component of the vehicle and/or at least one function of the vehicle. The at least one function of the vehicle may include, for example, a steering function, an acceleration function, a deceleration function (or a braking function), a lane change function, a lane detection function, a lateral control function, an obstacle recognition and distance detection function, a powertrain control function, a safety zone detection function, an engine on/off function, a power on/off function, and a vehicle lock/unlock function. The listed functions of the vehicle are only examples for understanding, and the examples of the present disclosure are not limited thereto.

A shoulder may mean a space between the outermost road boundary (the outermost lane boundary) in a traveling direction of the vehicle and a road edge (e.g., curb, guardrail). That is, the shoulder is a portion of a road and is formed at the edge of the road, and may refer to a space that provides a place allowing an emergency vehicle to stop, or to bypass a traffic jam, or allowing a vehicle to escape an active traffic congestion.

Figure 2:
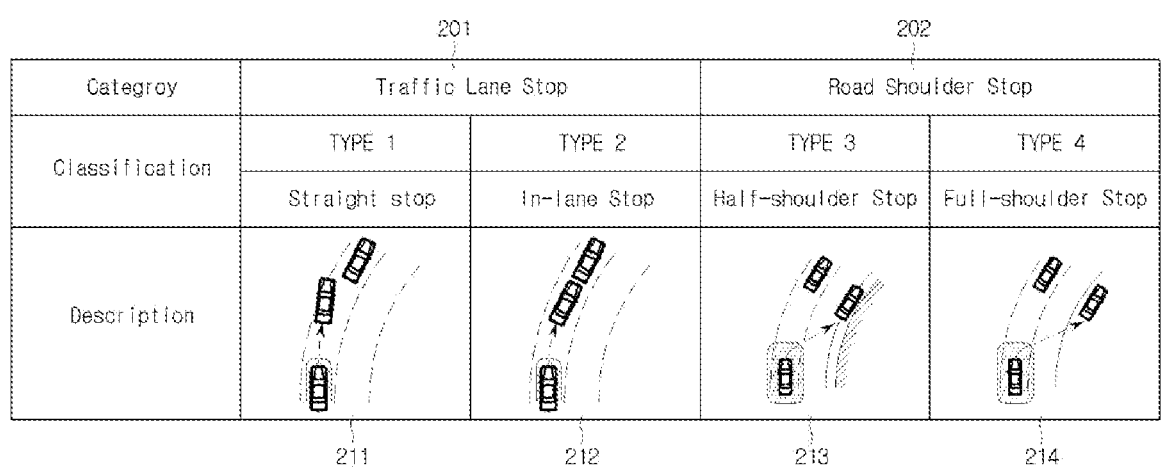
FIG. 2 shows an example of a minimum risk maneuver type according to various examples of the present disclosure.
Figure 3A:
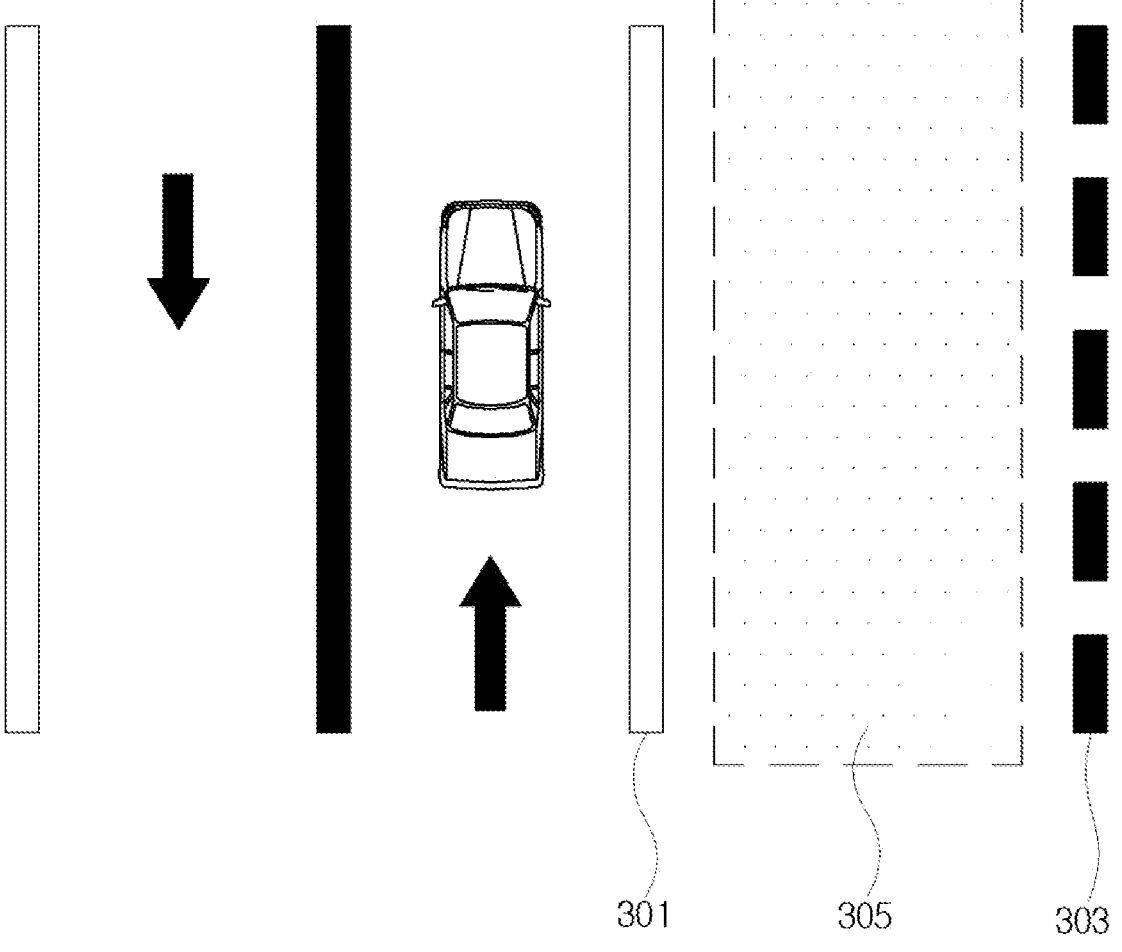
Figure 3B:
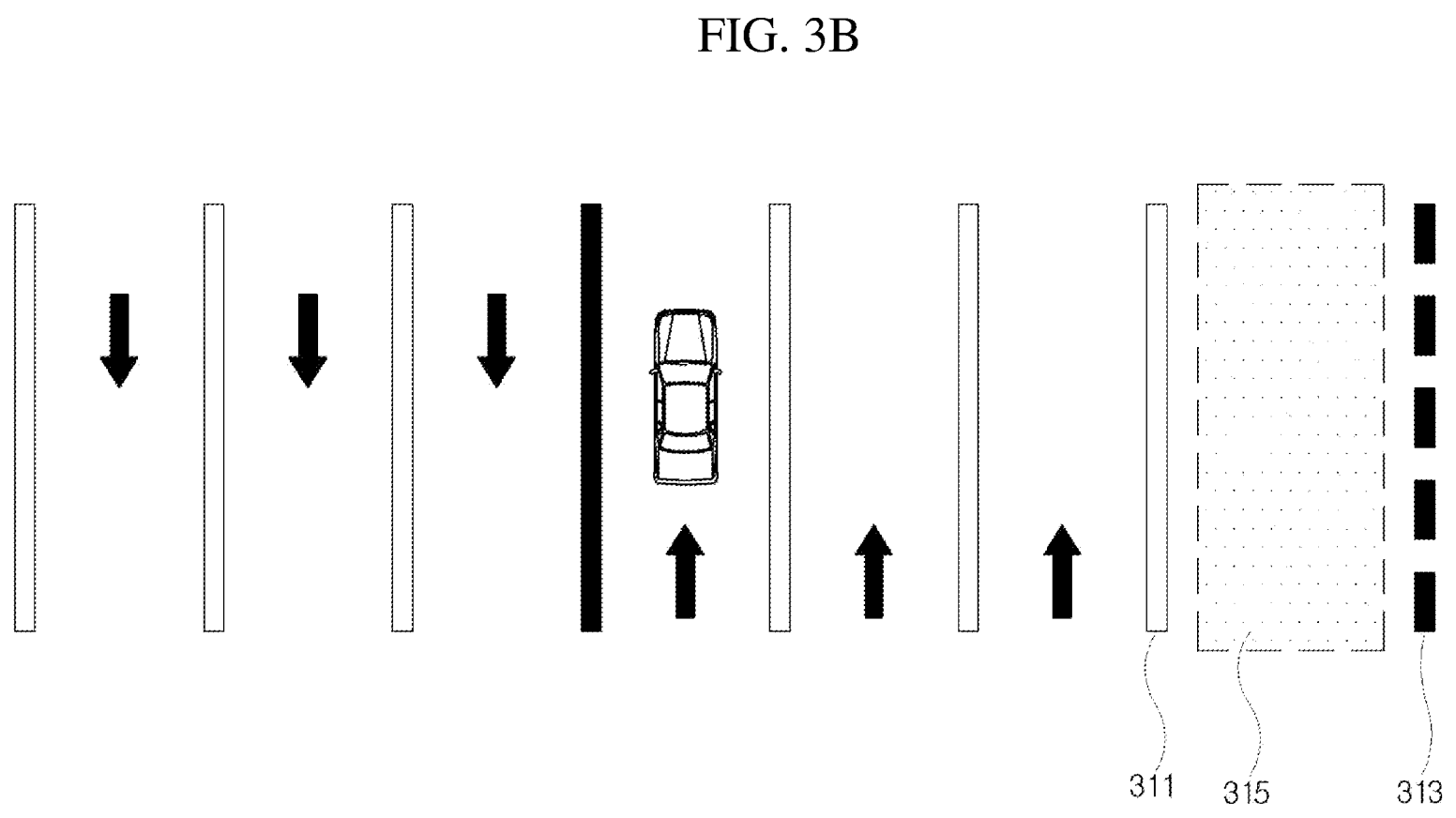
Figure 4A:
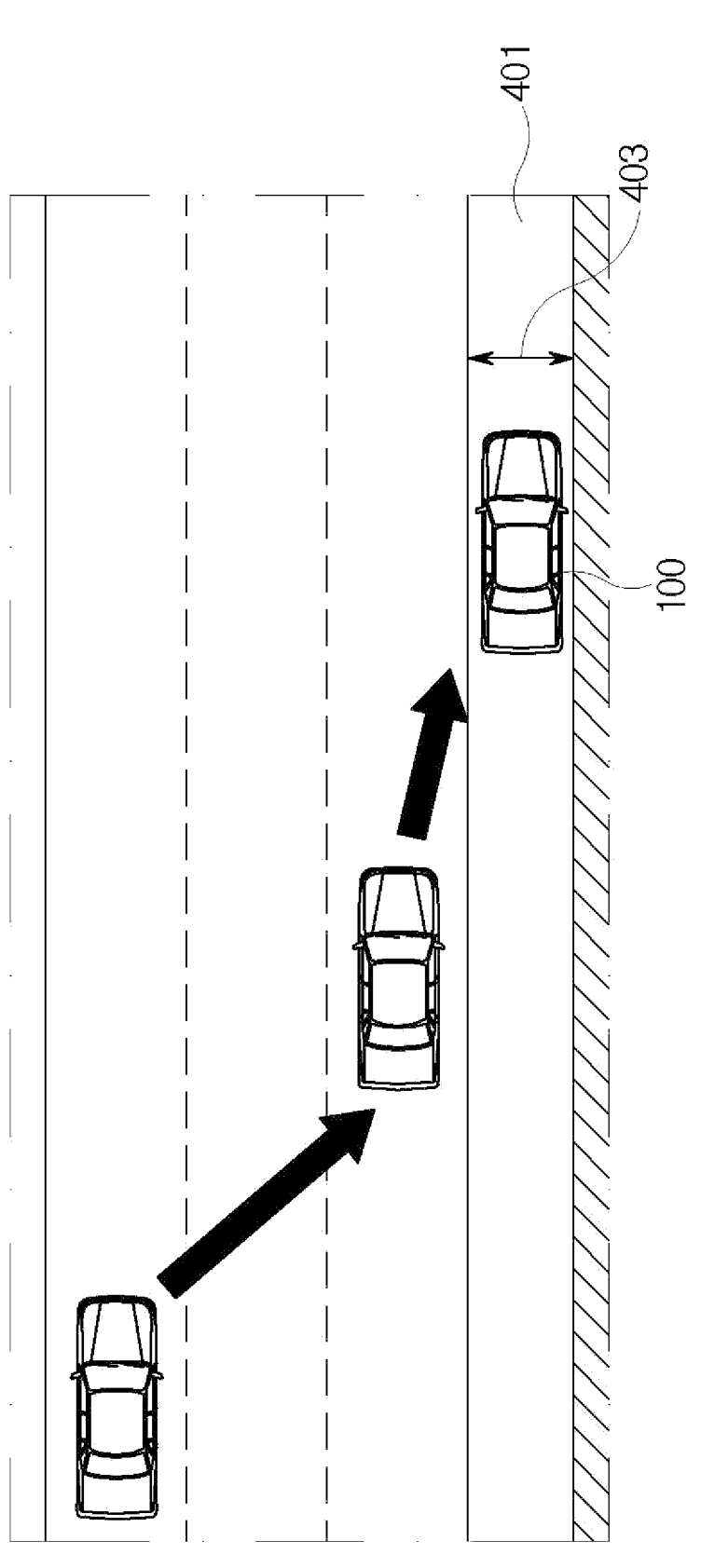
FIG. 4A shows an example in which a vehicle performs a full-shoulder stop according to various examples of the present disclosure.
Figure 4B:
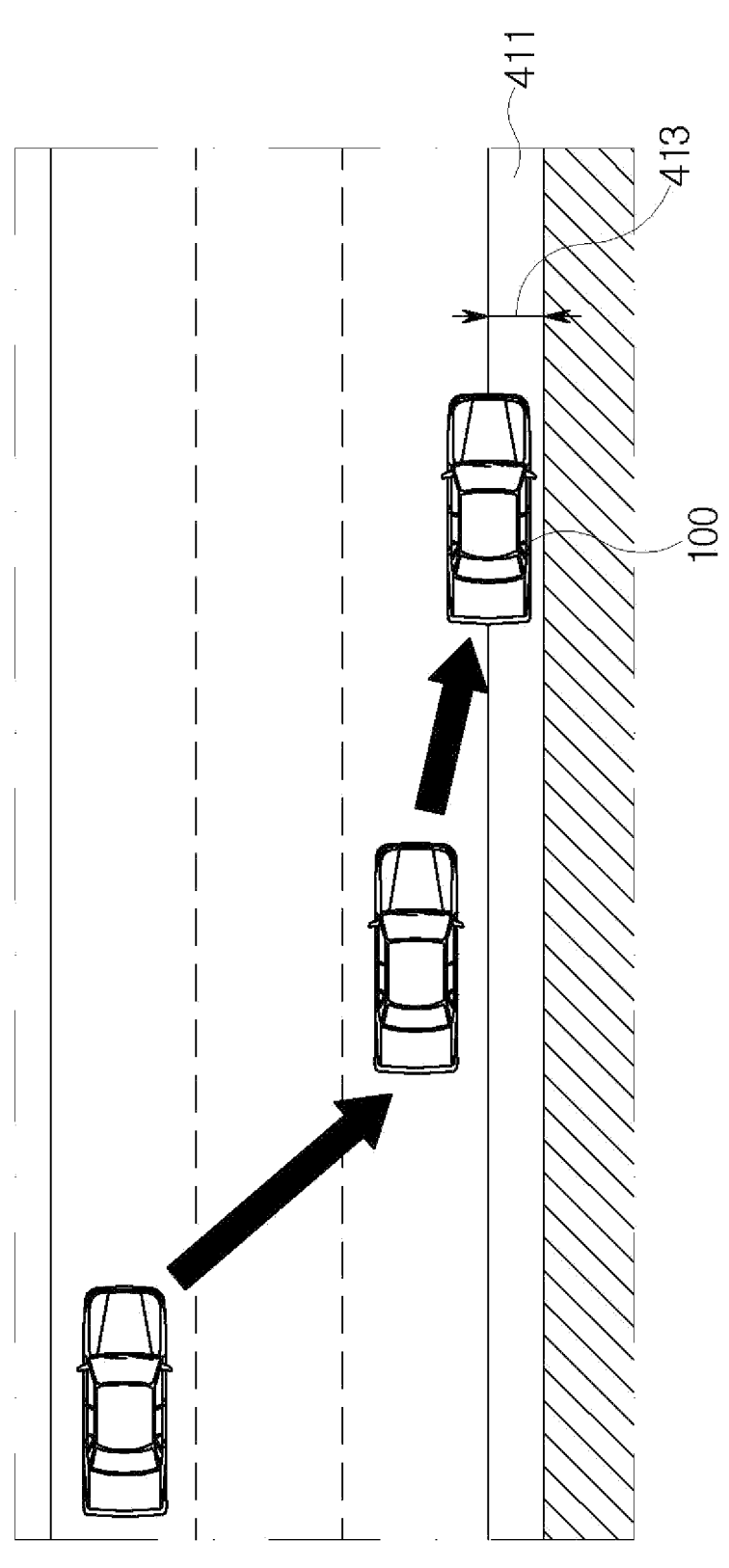
FIG. 4B shows an example in which a vehicle performs a half-shoulder stop according to various examples of the present disclosure.
Figure 5A:
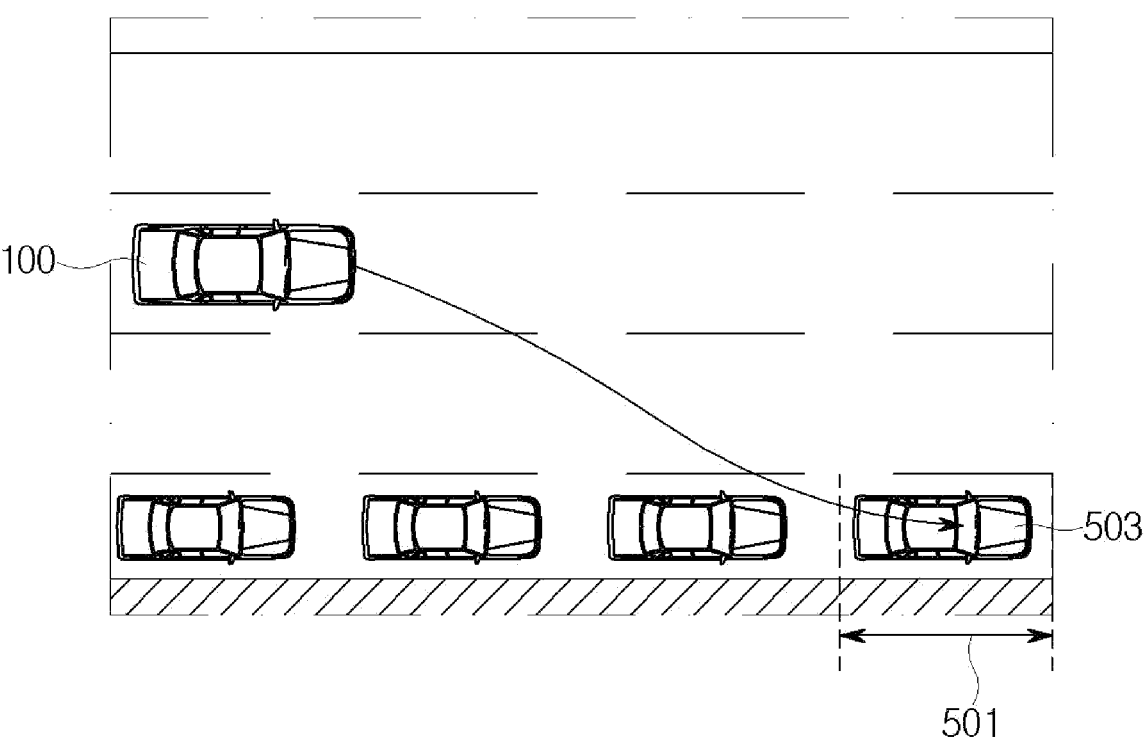
FIG. 5A shows an example in which a vehicle performs a parallel stop according to various examples of the present disclosure.
Figure 5B:
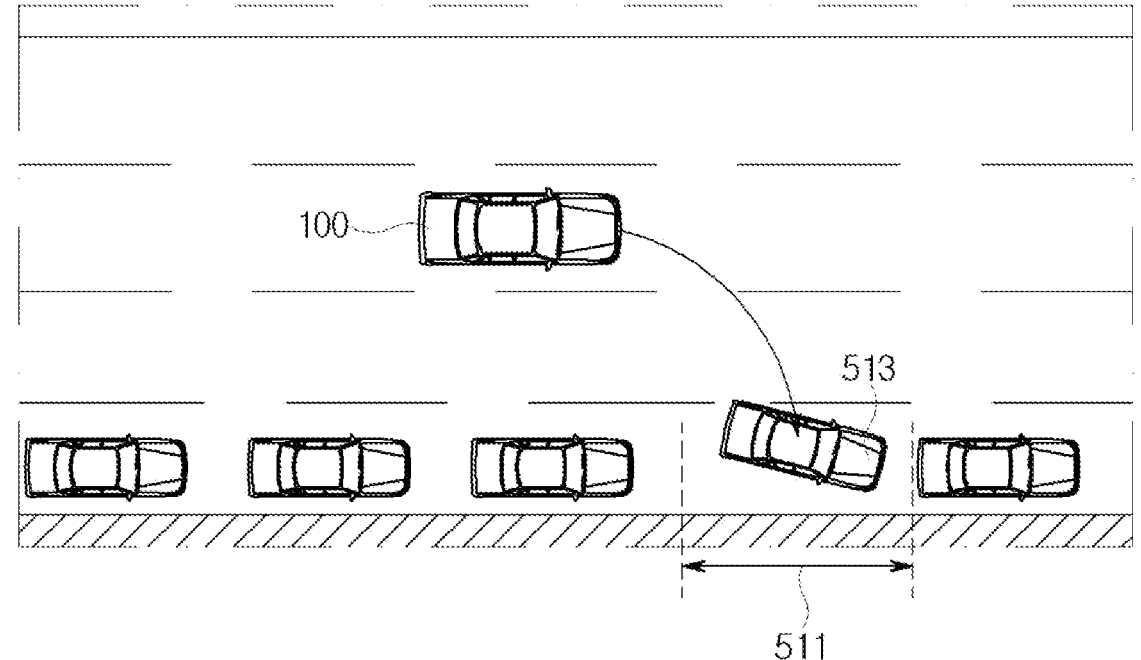
FIG. 5B shows an example in which a vehicle performs an oblique stop according to various examples of the present disclosure.
Figure 6A:
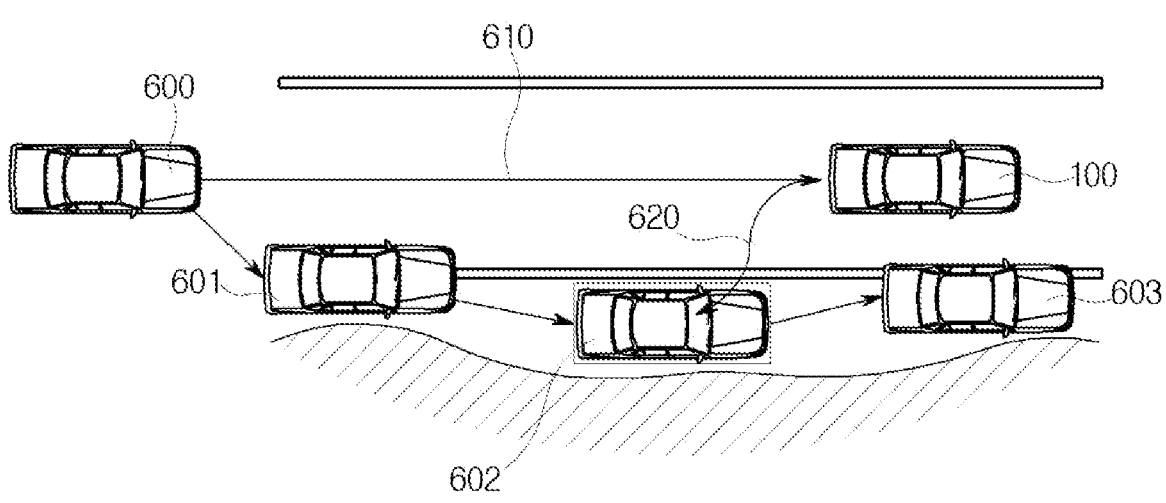
FIGS. 6A and 6B show an example of a stop method that may not be allowed according to various examples of the present disclosure.
Figure 6B:
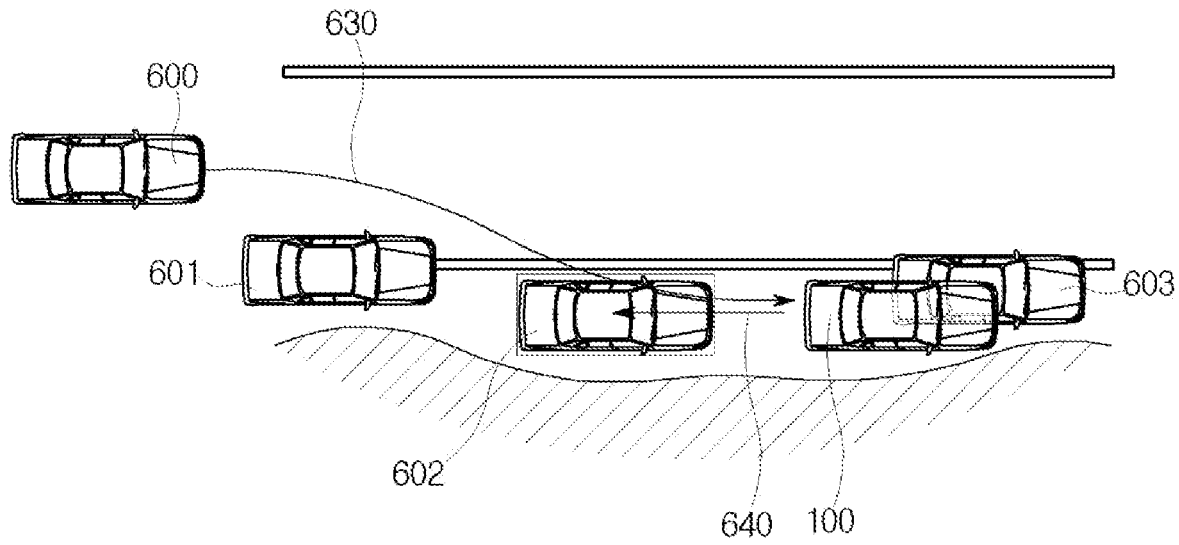

FIG. 1 shows an example of a vehicle according to various examples of the present disclosure. A vehicle shown in FIG. 1 is shown as an example. Each component of the electronic device may be configured with one chip, one part, or one electronic circuit or configured by combining chips, parts, and/or electronic circuits. According to the example, some of the components shown in FIG. 1 may be divided into a plurality of components and may be configured with different chips, parts or electronic circuits. Also, some components are combined and configured with one chip, one part, or one electronic circuit. According to the example, some of the components shown in FIG. 1 may be omitted or components not shown may be added. At least some of the components of FIG. 1 will be described with reference to FIGS. 2 to 6B. FIG. 2 shows an example of a minimum risk maneuver type according to various examples of the present disclosure. FIGS. 3A and 3B show examples of a shoulder area according to various examples of the present disclosure. FIG. 4A shows an example in which a vehicle performs a full-shoulder stop according to various examples of the present disclosure. FIG. 4B shows an example in which a vehicle performs a half-shoulder stop according to various examples of the present disclosure. FIG. 5A shows an example in which a vehicle performs a parallel stop according to various examples of the present disclosure. FIG. 5B shows an example in which a vehicle performs an oblique stop according to various examples of the present disclosure. FIGS. 6A and 6B show an example of a stop method that may not be allowed according to various examples of the present disclosure.

Referring to FIG. 1, a vehicle 100 may include a sensor unit 110, a controller 120, a processor 130, a display 140, and a communication device 150.

According to various examples, the sensor unit 110 may detect the surrounding environment of the vehicle 100 by using at least one sensor and may generate data related to the surrounding environment based on the detection result. For example, based on the sensing data obtained from at least one sensor, the sensor unit 110 may acquire information on objects around the vehicle (e.g., other vehicles, people, objects, curbs, guardrails, lanes, obstacles). The information on objects around the vehicle may include, for example, at least one of a position of the object, a size of the object, a shape of the object, a distance to the object, and a relative speed to the object. As another example, the sensor unit 110 may measure the position of the vehicle 100 by using at least one sensor. The sensor unit 110 may include, for example, at least one of a camera, a light detection and ranging (LI-DAR), a radio detection and ranging (RADAR), an ultrasonic sensor, an infrared sensor, and a position measuring sensor. The listed sensors are only examples for understanding, and the sensors of the present disclosure are not limited thereto.

According to the example, the camera may capture the surroundings of the vehicle and may generate image data including objects located at the front, rear and/or side of the vehicle 100. According to the example, the LIDAR may generate information on the objects located at the front, rear and/or side of the vehicle 100 by using light (or laser). According to the example, the RADAR may generate information on the objects located at the front, rear, and/or side of the vehicle 100 by using electromagnetic waves (or radio waves). According to the example, the ultrasonic sensor may generate information on the objects located at the front, rear, and/or side of the vehicle 100 by using ultrasonic waves. According to the example, the infrared sensor may generate information on the object located at the front, rear, and/or side of the vehicle 100 by using infrared light.

According to the example, the position measuring sensor may measure the current position of the vehicle 100. The position measuring sensor may include at least one of a global positioning system (GPS) sensor, a differential global positioning system (DGPS) sensor, and a global navigation satellite system (GNSS) sensor. The position measuring sensor may generate vehicle position data based on a signal generated by at least one of the GPS sensor, the DGPS sensor, and the GNSS sensor.

According to various examples, the controller 120 may control the operations of at least one component of the vehicle 100 and/or of at least one function of the vehicle under the control of the processor 130. The at least one function may include, for example, the steering function, the acceleration function (or a longitudinal acceleration function), the deceleration function (or a longitudinal deceleration function, a brake function), the lane change function, the lane detection function, the obstacle recognition and distance detection function, the lateral control function, the powertrain control function, the safety zone detection function, the engine on/off function, the power on/off function, and the vehicle lock/unlock function.

According to the example, the controller 120 may control the operation of at least one function of the vehicle and/or and at least one component of the vehicle for the purpose of autonomous driving and/or minimal risk maneuver (MRM) of the vehicle 100 under the control of the processor 130. For example, the controller 120 may control the operation of at least one of the steering function, the acceleration function, the deceleration function, the lane change function, the lane detection function, the lateral control function, the obstacle recognition and distance detection function, the powertrain control function, and the safety zone detection function.

According to various examples, the processor 130 may control overall operation of the vehicle 100. According to the example, the processor 130 may include an electrical control unit (ECU) capable of integrally controlling components within the vehicle 100. For example, the processor 130 may include a central processing unit (CPU) or a micro processing unit (MCU) which is capable of performing calculation processing.

According to various examples, the processor 130 may control components in the vehicle 100 so that the vehicle performs autonomous driving by activating an automated driving system (ADS) if a specified event occurs. The designated event may occur if a driver's autonomous driving is requested, a vehicle control authority is delegated from the driver, or a condition specified by the driver and/or a designer is satisfied.

According to various examples, the processor 130 may determine whether normal autonomous driving is possible, based on at least one of vehicle state information and surrounding environment information during the autonomous driving. According to the example, the processor 130 may monitor the mechanical and/or electrical states of the components (e.g., a sensor, an ADS processor, an actuator, etc.) within the vehicle from a point of time if the ADS is activated, and may acquire the vehicle state information that indicates whether the mechanical faults and/or electrical faults of the internal components of the vehicle occur. The vehicle state information may include information on the mechanical and/or electrical states of the components within the vehicle. According to the example, the processor 130 may acquire the environment information on the surroundings of the vehicle through the sensor unit 110 from the point of time if the ADS is activated.

According to the example, the processor 130 may determine whether or not functions desired for the autonomous driving are normally operable, based on the vehicle state information. The function desired for the autonomous driving may include, for example, at least one of the lane detection function, the lane change function, the lateral control function, the deceleration (or brake control) function, the powertrain control function, the safety zone detection function, and the obstacle recognition and distance detection function. If at least one of the functions desired for the autonomous driving cannot normally operate, the processor 130 may determine that normal autonomous driving is impossible.

According to the example, the processor 130 may determine whether the condition of the vehicle is suitable for general driving conditions, based on the vehicle state information. For example, the processor 130 may determine whether mechanical state information (e.g., battery overheating information or tire pressure information) of the vehicle is suitable for general driving conditions. If the condition of the vehicle is not suitable for general driving conditions, the processor 130 may determine that normal autonomous driving is impossible.

According to the example, based on at least one of pieces of surrounding environment information, the processor 130 may determine whether an environment around the vehicle is suitable for an operation design domain (ODD) of autonomous driving. The operation design domain may represent conditions of the surrounding environment in which autonomous driving is normally performed. If the surrounding environment information of the vehicle does not conform to the operation design domain, the processor 130 may determine that normal autonomous driving is impossible.

According to various examples, if normal autonomous driving is impossible, the processor 130 may determine to perform the minimum risk maneuver for minimizing the risk of an accident. If the minimum risk maneuver is desired to be performed, the processor 130 may determine a minimum risk maneuver type.

According to various examples, even if an abnormal signal for the driver is detected or an emergency stop is desired while the ADS operates normally, the processor 130 may determine to perform the minimum risk maneuver for minimizing the risk of an accident. The abnormal signal for the driver may include a case where a driver's vital signal is abnormal or there is no response of the driver to a handover request. The emergency stop may be requested by the driver or a third party, such as a police officer.

According to the example, the minimum risk maneuver type may include, as shown in FIG. 2, a traffic lane stop 201 and a road shoulder stop 202.

The traffic lane stop may be divided into a straight stop 211 and an in-lane stop 212. The road shoulder stop may be divided into a half-shoulder stop 213 and a full-shoulder stop 214.

The straight stop 211 is a type in which the vehicle is stopped by using only a longitudinal deceleration function. The straight stop 211 does not involve lateral control. For example, the straight stop may be performed in a situation where the lateral control is impossible due to the fault in an actuator for the lateral control or the lane detection is impossible.

The in-lane stop 212 is a type in which the vehicle stops within the boundary of the lane in which the vehicle is traveling. For example, the in-lane stop 212 may refer to a type in which the vehicle stops within the boundary of the lane in which the vehicle is traveling through the lateral control and/or deceleration. The lane in which the vehicle is traveling may refer to a lane in which the vehicle is traveling at a point of time if the minimum risk maneuver is determined to be performed.

The half-shoulder stop 213 is a type in which the vehicle stops in a state where a portion of the vehicle is positioned on the shoulder of the road. The half-shoulder stop may be accompanied by the lane change. For example, the half-shoulder stop 213 may refer to a type in which, through the longitudinal acceleration, longitudinal deceleration, and/or lateral control, the vehicle moves such that only a portion of the vehicle is positioned on the shoulder out of the road boundary (or out of the outermost lane boundary) and then stops.

The full-shoulder stop 214 is a type in which the vehicle stops in a state where the entire vehicle is positioned on the shoulder of the road. The full-shoulder stop 214 may be accompanied by the lane change. For example, the full-shoulder stop 214 may refer to a type in which, through longitudinal acceleration, longitudinal deceleration, and/or lateral control, the vehicle moves such that the entire vehicle is positioned on the shoulder out of the road boundary and then stops.

According to the example, the processor 130 may determine the minimum risk maneuver type as one of the traffic lane stop and the road shoulder stop based on at least one of the vehicle state information, external environment information, and the Road Traffic Act. According to the example, the processor 130 may determine the minimum risk maneuver type as a basic type predetermined by a designer, regardless of the vehicle state information, the external environment information, and the Road Traffic Act. The predetermined basic type may be the road shoulder stop. This is because the Road Traffic Act permits (or recommends) to stop the vehicle on a shoulder that is a relatively safe area, in the event of an emergency due to a vehicle breakdown or the like. Therefore, in various examples of the present disclosure, the basic type is predetermined as the road shoulder stop, so that it is possible to minimize the effect of the minimum risk maneuver of the vehicle on the traffic flow, to minimize the possibility of a secondary collision, and to enable the driver or passenger to evacuate out of the road.

According to the example, if the ADS system operates normally but the condition of the vehicle is not suitable for general driving conditions, the processor 130 may determine the minimum risk maneuver type as the road shoulder stop. For example, if the ADS system operates normally but battery overheating or tire puncture is detected, the processor 130 may determine the minimum risk maneuver type as the road shoulder stop.

According to the example, even if an abnormal signal for the driver is detected or an emergency stop is desired, the processor 130 may determine the minimum risk maneuver type as the road shoulder stop.

According to the example, if the minimum risk maneuver type is determined as the road shoulder stop, the processor 130 may move the vehicle toward the shoulder through lateral and/or longitudinal control and may control the position of the vehicle such that at least a portion of the vehicle is positioned on the shoulder of the road. The processor 130 may obtain position information on the shoulder of the road from at least one sensor of the sensor unit 110 or pre-stored map data, and may move the vehicle toward the shoulder based on the obtained position information on the shoulder of the road. As shown in FIGS. 3A and 3B, the road shoulder may refer to spaces 305 and 315 between the outermost road boundaries 301 and 311 located on the right side of the vehicle and obstacles 303 and 313 at spaces 305 and 315. The obstacles 303 and 313 may include, for example, at least one of a curb and a guardrail.

According to the example, if the minimum risk maneuver type is determined as the road shoulder stop, the processor 130 may search for a road shoulder where the vehicle 100 can stop. For example, the processor 130 may search for a road shoulder area where the vehicle can stop, by using at least one sensor (e.g., a camera, RADAR, and/or LIDAR) of the sensor unit 110 and/or pre-stored map data. Here, the road shoulder area where the vehicle can stop may refer to an empty road shoulder area that is not occupied by another object (e.g., other vehicles, pedestrians, objects, obstacles, etc.) and has a width and/or length greater than or equal to a specified minimum width and/or minimum length.

According to the example, if there is no road shoulder area where the vehicle 100 can stop within a specified threshold range based on a current position of the vehicle 100, the processor 130 may change the minimum risk maneuver type. For example, the processor 130 may change the minimum risk maneuver type to the traffic lane stop and may perform the lane stop.

According to the example, if there is a plurality of road shoulder areas where the vehicle 100 can stop within a specified threshold range based on a current position of the vehicle 100, the processor 130 may determine one road shoulder area, based on at least one of a distance from the current position, the size of a nearby obstacle, and the type of the nearby obstacle. The determined road shoulder area may refer to a road shoulder area where the vehicle 100 will stop. According to the example, the processor 130 may determine a detailed stop type for the road shoulder stop based on information on the size of the determined road shoulder area (e.g., width or length information of the road shoulder). The detailed stop type may include at least one of the half-shoulder stop, the full-shoulder stop, the parallel stop, or the oblique stop. The parallel stop may mean that a vehicle stops in parallel to the outermost lane boundary and/or an obstacle (e.g., a curb or a guardrail) adjacent to the outermost lane. The oblique stop may mean that a vehicle stops obliquely with respect to the outermost lane boundary and/or an obstacle adjacent to the outermost lane, without being parallel. That is, the oblique stop may mean that a vehicle stops at a certain angle with the outermost lane boundary and/or an obstacle adjacent to the outermost lane. The information on the size of the road shoulder area may be obtained from at least one sensor (e.g., a camera, RADAR, and/or LIDAR) of the sensor unit 110 or pre-stored map data.

The processor 130 may compare the width of the road shoulder area with a specified width. The specified width may be a width of the vehicle, a width obtained by adding a first threshold value to the width of the vehicle, or a predetermined width according to the type of the vehicle. For example, if the vehicle is a passenger vehicle, the specified width may be preset to about 2 M. According to the example, if a width 403 of a road shoulder area 401 is, as shown in FIG. 4A, greater than or equal to a specified width, the processor 130 can control the vehicle 100 to perform the full-shoulder stop. According to the example, if a width 413 of a road shoulder area 411 is, as shown in FIG. 4B, less than a specified width, the processor 130 can control the vehicle 100 to perform the half-shoulder stop.

The processor 130 may compare the length of the road shoulder area with a specified length. The specified length may be a length of the vehicle, a length obtained by adding a second threshold value to the length of the vehicle, or a predetermined length according to the type of the vehicle. According to the example, if a length 501 of the road shoulder area is, as shown in FIG. 5A, greater than or equal to a specified length, the processor 130 can control the vehicle to perform a parallel stop 503. According to the example, if the length of the road shoulder area is less than a specified length 511, the processor 130 can control the vehicle to perform an oblique stop 513.

According to the example, the processor 130 may control the vehicle not to stop or reverse while the vehicle moves toward the road shoulder area and performs a stop according to the stop type. For example, the processor 130 may control, as shown in FIG. 6A, the vehicle such that the vehicle 100 travels 610 forward from a position of a point of time if the minimal risk maneuver type is determined to be performed, that is, a current position 600 and then does not reverse 620 toward a second position 602 that is the road shoulder area. If the road shoulder area where the vehicle is to stop is a third position 603, the processor 130 may control the vehicle by using the longitudinal deceleration function and/or lateral control function such that the vehicle moves from the current position 600 to the third position 603 through a first position 601 and the second position 602 and then stops at the third position 603. According to the example, the processor 130 may control such that the vehicle does not stop or reverse even in the road shoulder area. For example, as shown in FIG. 6B, the processor 130 may control the vehicle such that the vehicle 100 moves 630 from the current position 600 to the third position 603 and then does not reverse 640 toward the second position 602. If the road shoulder area where the vehicle is to stop is the second position 602, the processor 130 may control the vehicle by using the longitudinal deceleration function and/or lateral control function such that the vehicle moves from the current position 600 to the second position 602 through the first position 601 and then stops at the second position 602.

According to the example, the processor 130 may determine whether the road shoulder stop is completed within a specified time, and may determine whether to change the minimum risk maneuver type based on the determination result. If the road shoulder stop is not completed within a specified time, the processor 130 may change the minimum risk maneuver type from the road shoulder stop to the traffic lane stop. For example, if the road shoulder stop is not completed within a specified time, the processor 130 may change the minimum risk maneuver type from the road shoulder stop to the in-lane stop among the traffic lane stop, so that the vehicle can be controlled to perform the in-lane stop. If the in-lane stop is not completed within a specified time, the processor 130 may change the minimum risk maneuver type from the in-lane stop to the straight stop, so that the vehicle can be controlled to perform the straight stop.

According to various examples, the processor 130 may perform an operation to stop the vehicle according to the determined minimum risk maneuver type, and may determine whether a minimum risk condition (MRC) is satisfied. The MRC may mean a stationary state where the speed of the vehicle is zero. For example, the processor 130 may determine whether the vehicle 100 enters a stationary state in which the speed of the vehicle 100 is zero while the vehicle 100 performs at least one operation according to the determined minimum risk maneuver type. The processor 130 may determine that the minimum risk condition is satisfied if the speed of the vehicle 100 is zero.

According to various examples, if the MRC is satisfied, the processor 130 may terminate the performing operation of the minimal risk maneuver and may switch the autonomous driving system (ADS) to a standby state or an off state. According to the example, after switching the autonomous driving system (ADS) to a standby state or an off state, the processor 130 may control such that the vehicle control authority is transferred to the driver (or user).

According to various examples, the display 140 may visually display information related to the vehicle 100. For example, the display 140 may provide a variety of information related to the state of the vehicle 100 to the driver of the vehicle 100 under the control of the processor 130. The variety of information related to the state of the vehicle may include at least one of information indicating whether various components included in the vehicle and/or at least one function of the vehicle normally operate, and information indicating the driving state of the vehicle. The driving state of the vehicle may include, for example, at least one of a state in which the vehicle is being autonomously driven, a state in which the vehicle is performing the minimal risk maneuver, a state in which the minimal risk maneuver has been completed, and a state in which the autonomous driving has been ended.

According to various examples, the communication device 150 may communicate with an external device of the vehicle 100. According to the examples, the communication device 150 may receive data from the outside of the vehicle 100 or may transmit data to the outside of the vehicle 100 under the control of the processor 130. For example, the communication device 150 may perform communication by using a wireless communication protocol or a wired communication protocol.

Although the controller 120 and the processor 130 have been described as separate components in FIG. 1 described above, the controller 120 and the processor 130 may be integrated into one component according to various examples.

FIG. 7 shows an example of showing operations of the vehicle according to various examples of the present disclosure. Referring to FIG. 7, the vehicle 100 may normally operate the ADS in operation S710.

According to the example, the vehicle 100 may monitor the vehicle state and the surrounding environment while performing the autonomous driving according to the normal operation of the ADS. The vehicle 100 may detect whether the minimum risk maneuver is desired, based on information obtained by monitoring the vehicle state and the surrounding environment. If the minimum risk maneuver is desired, an event A1 may occur.

According to the example, the vehicle 100 may detect whether the intervention of the driver (or user) is desired, while performing the autonomous driving in accordance with the normal operation of the ADS. If the intervention of the driver is desired, the vehicle 100 may perform a request to intervene (RTI) of the driver through the ADS or may issue a warning. The RTI of the driver or the warning may be an event A2. If the event A1 occurs while the ADS is normally operating, the vehicle 100 may proceed to operation S720.

If the event A2 occurs while the ADS is normally operating, the vehicle 100 may determine whether the intervention of the driver is detected within a specified time in operation S750. If the intervention of the driver is not detected within the specified time, the vehicle 100 may determine that an event B1 has occurred. If the event B1 has occurred, the vehicle 100 may proceed to operation S720. If the intervention of the driver is detected within a specified time, the vehicle 100 may determine that an event B2 has occurred. If the event B2 has occurred, the vehicle 100 may proceed to operation S740.

The vehicle 100 may perform the minimum risk maneuver (MRM) in operation S720. According to the example, the vehicle 100 may determine the MRM type based on at least one of the vehicle state information, the surrounding environment information, and the Road Traffic Act. According to the example, the vehicle 100 may determine the minimum risk maneuver type as a basic type predetermined by a designer, regardless of the vehicle state information, the external environment information, and the Road Traffic Act. The predetermined basic type may be the road shoulder stop. As shown in FIG. 2, the minimum risk maneuver type may include the traffic lane stop 201 including the straight stop 211 and the in-lane stop 212, and the road shoulder stop 202 including the half-shoulder stop 213 and the full-shoulder stop 214.

The vehicle 100 may control at least one component within the vehicle in order to stop the vehicle according to the determined minimal risk maneuver type. According to the example, the vehicle 100 may notify other vehicles of information indicating that the vehicle is performing the minimum risk maneuver.

The vehicle 100 may determine whether or not the minimum risk condition is satisfied by that the speed of the vehicle becomes zero by performing the minimum risk maneuver in operation S720. If the minimum risk maneuver is satisfied, the vehicle 100 may determine that an event C1 has occurred and may proceed to operation S730. The vehicle 100 may determine whether the intervention of the driver is detected during the performance of the minimum risk maneuver. If the intervention of the driver is detected, the vehicle 100 may determine that an event C2 has occurred and may proceed to operation S740.

The vehicle 100 may maintain a state in which the minimum risk condition is satisfied in operation S730. The state in which the minimum risk condition is satisfied may mean a state in which the vehicle is stopped. For example, the vehicle 100 may maintain the stationary state of the vehicle. For example, the vehicle 100 may perform a control operation to maintain the vehicle to be in the stationary state regardless of the slope of the road surface at the stop location. The vehicle 100 may determine whether an event D1 occurs, while maintaining the state in which the minimum risk condition is satisfied. The event D1 may include at least one of ADS off by the driver and the completion of the transfer of the vehicle control authority to the driver. If the event D1 occurs, the vehicle 100 may proceed to operation S740.

The vehicle 100 may switch the ADS to a standby state or an off state in operation S740. The vehicle 100 does not perform an operation for the autonomous driving while the ADS is in the standby state or in the off state.

In operations S710, S720, S730, and S750 described above, the ADS may be in an active state, and in operation S740, the ADS may be in an inactive state.

Figure 8:
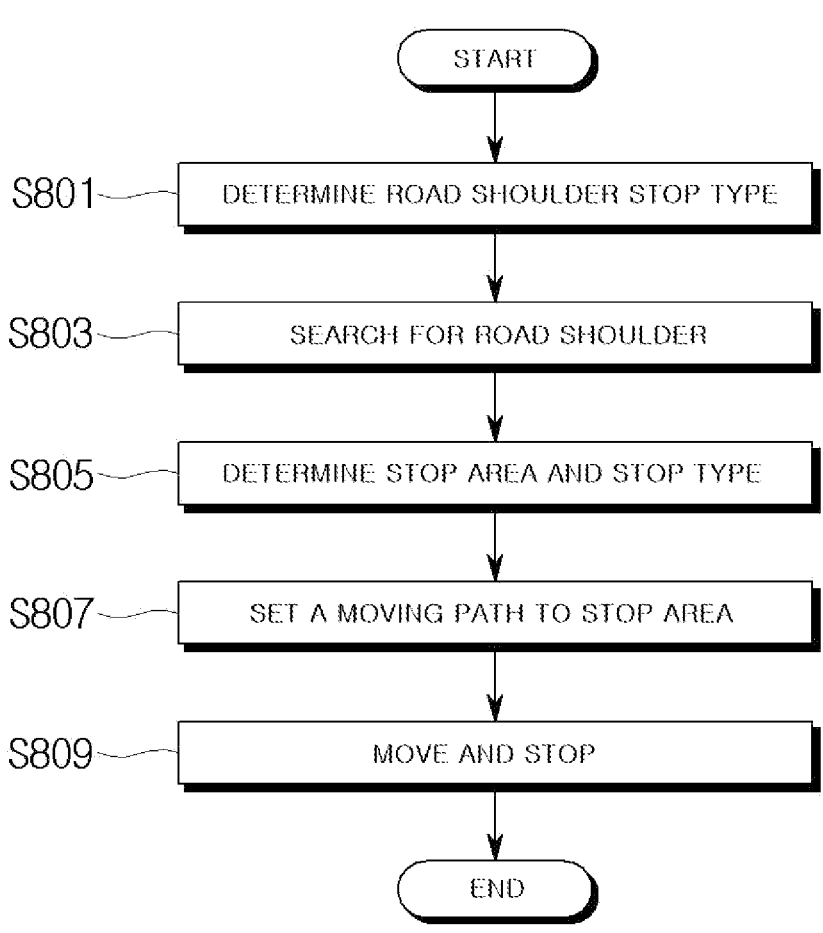
FIG. 8 shows an example of showing that a stop is performed according to the minimum risk maneuver by a vehicle according to various examples of the present disclosure.

FIG. 8 shows an example of showing that a stop is performed according to the minimum risk maneuver by a vehicle according to various examples of the present disclosure. Operations of FIG. 8 may be detailed operations of operation S720 of FIG. 7. In the following example, respective operations may be sequentially performed, and may not be necessarily performed sequentially. For example, the order of the respective operations may be changed, and at least two operations may be performed in parallel. In addition or alternative, the following operations may be performed by the processor 130 and/or the controller 120 included in the vehicle 100, or may be implemented with instructions that can be executed by the processor 130 and/or the controller 120.

Although the operations of FIG. 8 exemplifies stopping according to the minimum risk maneuver, according to another example, the operation of FIG. 8 may be used in case that vehicle stops according to the user's request or a normal operation.

Referring to FIG. 8, the vehicle 100 may determine the minimum risk maneuver type (MRM type) as the road shoulder stop type in operation S801. According to the example, if normal autonomous driving is impossible, the vehicle 100 may determine the minimum risk maneuver type as the road shoulder stop based on the Road Traffic Act that permits (or recommends) the road shoulder stop. to minimize the possibility of a secondary collision, and to enable the driver or passenger to evacuate out of the road. This intends to minimize the effect of the stop of the vehicle according to the minimum risk maneuver of the vehicle 100 on the traffic flow, to minimize the possibility of a secondary collision, and to enable the driver or passenger to easily evacuate out of the road. According to the example, if it is checked that the ADS system operates normally but the condition of the vehicle is not suitable for general driving conditions, the vehicle 100 may determine the minimum risk maneuver type as the road shoulder stop, based on the vehicle state information and/or the surrounding environment information. According to the example, even if an abnormal signal for the driver is detected or an emergency stop is desired, the vehicle 100 may determine the minimum risk maneuver type as the road shoulder stop.

The vehicle 100 may search for a road shoulder in operation S803. According to the example, the vehicle 100 may search for a road shoulder area where the vehicle 100 can stop by using at least one sensor (e.g., a camera, RADAR, and/or LIDAR) or may search for a road shoulder area where the vehicle 100 can stop by using pre-stored map data. The road shoulder area where the vehicle can stop may refer to an empty road shoulder area that is not occupied by another object (e.g., other vehicles, pedestrians, objects, obstacles, etc.) and has a width and/or length greater than or equal to a specified minimum width and/or minimum length.

The vehicle 100 may determine a stop area and a stop type in operation S805. According to the example, if there is a plurality of road shoulder areas where the vehicle 100 can stop within a specified threshold range based on a current position of the vehicle 100, the processor 130 may determine one road shoulder area, based on at least one of a distance from the current position, the size of a nearby obstacle, and the type of the nearby obstacle. The determined road shoulder area may refer to a stop area where the vehicle 100 performs the road shoulder stop.

If the road shoulder area where the vehicle stops is determined, the processor 130 may determine a detailed stop type. The detailed stop type may include at least one of the half-shoulder stop, the full-shoulder stop, the parallel stop, or the oblique stop.

According to the example, the processor 130 may compare the width and/or length of the road shoulder area with a specified width and/or length, and may determine, according to the comparison result, one or two stop types among the full-shoulder stop, the half-shoulder stop, the parallel stop, or the oblique stop.

For example, if the width and length of the road shoulder area are greater than the specified width and length, the processor 130 may select the full-shoulder stop and the parallel stop. As another example, if the width and length of the road shoulder area are less than the specified width and length, the processor 130 may select the half-shoulder stop and the oblique stop. As further another example, if the width of the road shoulder area is less than the specified width and the length of the road shoulder area is greater than the specified length, the processor 130 may select the half-shoulder stop and the parallel stop.

The vehicle 100 may set a moving path for moving to the stop area, that is, the determined road shoulder area, in operation S807. The moving path to the determined road shoulder area may be set based on at least one of current position information, position information on the determined road shoulder area, and/or surrounding objects (e.g., other vehicles, pedestrians, obstacles). Here, the moving path may be set such that an intermediate stop or reverse is not performed. The stopping or reversing of the vehicle may not be allowed while moving to the road shoulder area determined for the road shoulder stop.

In operation S809, the vehicle 100 may move along the set moving path and then may stop in the determined road shoulder area. According to the example, the vehicle 100 may move to the road shoulder area along the set moving path, by controlling at least one of the longitudinal acceleration, longitudinal deceleration, and lateral control based on one piece of information. According to the example, the vehicle 100 may move to the road shoulder area and may stop according to the detailed stop type determined in operation S805. For example, if the determined detailed stop type is the full-shoulder stop and the parallel stop, the vehicle 100 may control to stop in parallel to the outermost road boundary and/or obstacles at the edge of the road (e.g., a curb or a guardrail), while moving such that the entire vehicle is positioned on the road shoulder area out of the road boundary (or the outermost lane). As another example, if the determined detailed stop type is the half-shoulder stop and the oblique stop, the vehicle 100 may control to stop obliquely with respect to or stop at a certain angle with the outermost road boundary and/or obstacles at the edge of the road, while moving such that only a portion of the vehicle is positioned on the road shoulder area out of the road boundary.

The vehicle 100 may control not to stop or reverse while moving to the road shoulder area and stopping.

If the road shoulder stop is completed according to the aforementioned FIG. 8, the vehicle 100 may terminate operations of FIG. 8 and proceed to operation S730 of FIG. 7.

Although not shown, in operation S803, if the road shoulder area where the vehicle can stop is not searched, the vehicle 100 may change the minimum risk maneuver type from the road shoulder stop to the traffic lane stop.

Figure 9A:
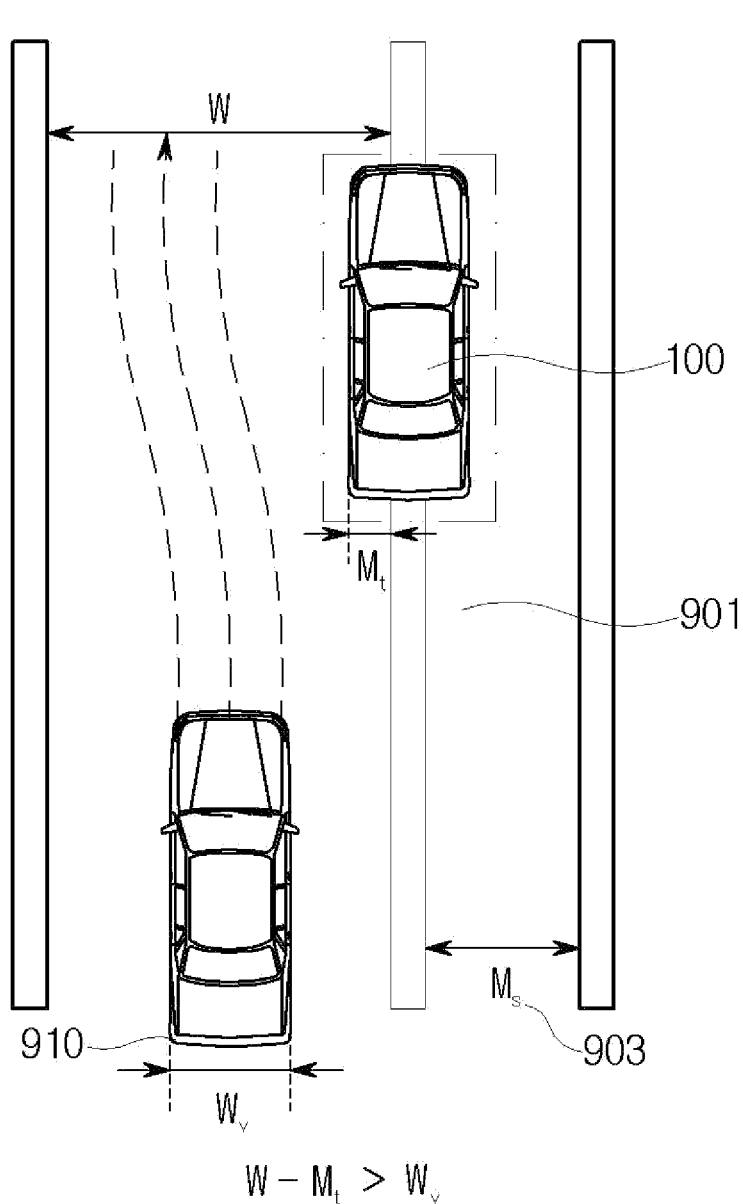
FIGS. 9A and 9B show an example of determining a stop area according to various examples of the present disclosure.
Figure 9B:
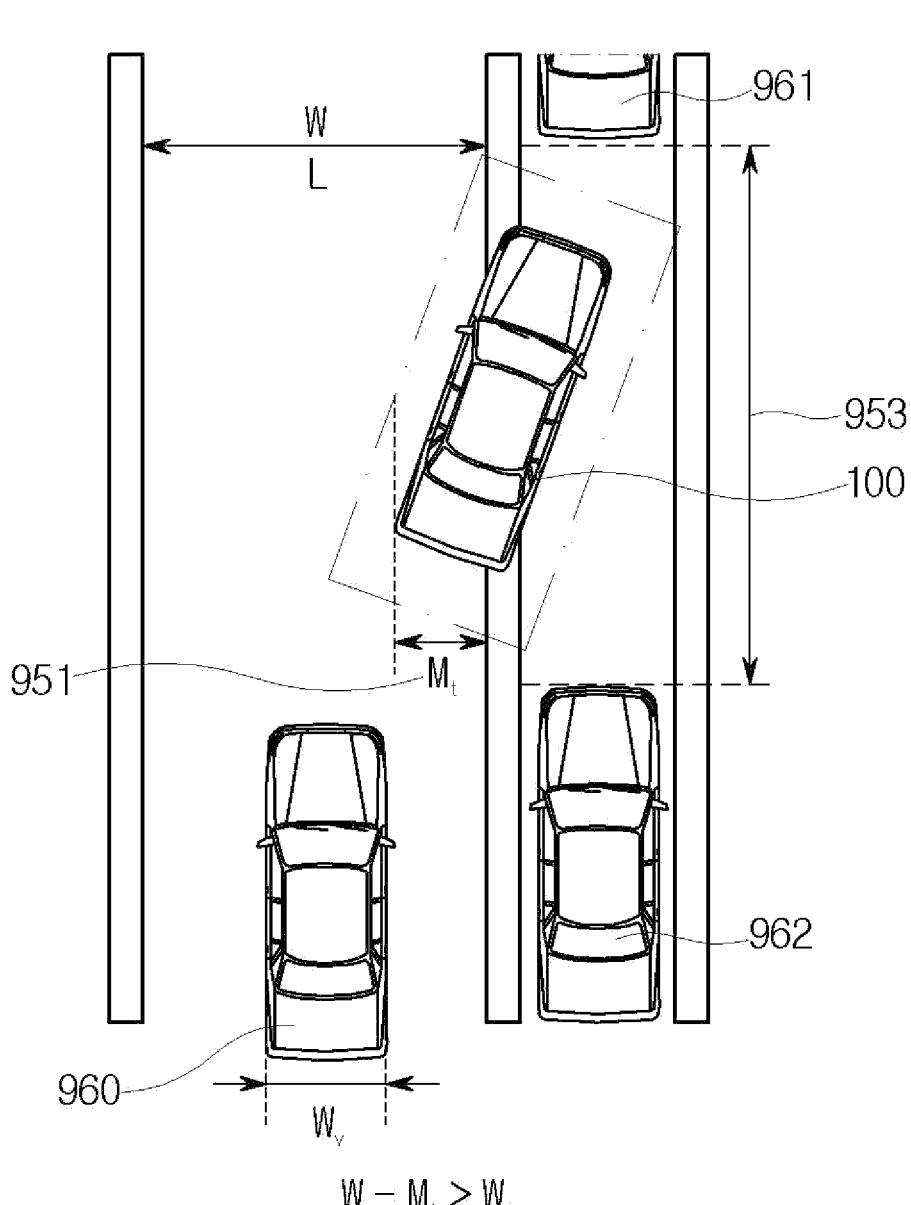

In the above description, if searching for the road shoulder area where the vehicle can stop, the vehicle 100 may search, with the highest priority, for an area where the vehicle 100 can perform the full-shoulder stop and the parallel stop within a specified threshold range. However, if there is no road shoulder area where the full-shoulder stop and the parallel stop are possible, the vehicle 100 may search for an area where the half-shoulder stop is possible. The area where the half-shoulder stop is possible may be determined as an area that does not affect the traveling of another vehicle even through the vehicle 100 performs the half-shoulder stop and the parallel stop or performs the half-shoulder stop and the oblique stop. For example, if the vehicle 100 performs, as shown in FIG. 9A, the half-shoulder stop and the parallel stop, or performs, as shown in FIG. 9B, the half-shoulder stop and the oblique stop, the vehicle 100 can predict sizes (e.g., maximum sizes) respectively $M_t$ 901 of FIG. 9A and $M_t$ 951 of FIG. 9B at which the vehicle 100 crosses a driving lane. Only if a value $(W-M_t)$ obtained by subtracting the predicted maximum size $M_t$ from a width W of the driving lane is greater than a predetermined size $W_v$ (e.g., sizes of other vehicles 910 and 960) $(W-M_t>W_v)$, the vehicle 100 may determine the corresponding area as the road shoulder area where the half-shoulder stop is possible. Here, the width W of the driving lane can be obtained from at least one sensor of the sensor unit 110 or pre-stored map data. The predicted maximum size $M_t$ can be calculated based on a width $M_s$ 903 of the corresponding road shoulder area, a length 953 of the road shoulder area, and/or the size of the vehicle 100 (e.g., width and/or length). Here, the length 953 of the road shoulder area may be determined as an area between other objects (e.g., other vehicles, pedestrians, objects, obstacles, etc.) 961 and 962 existing on the road shoulder. The size $W_v$ of another vehicle may be set in advance by an operator. For example, the size of another vehicle may be set to an average width of a plurality of vehicles or to a maximum width of the vehicle. As another example, the size of another vehicle may be set to a value obtained by adding a specified third threshold value to the average width of a plurality of vehicles or to the maximum width of the vehicle. The above-described size $W_v$ of another vehicle is only an example, and various examples of the present disclosure are not limited thereto.

According to various examples of the present disclosure, a vehicle control device that controls the vehicle may include the processor 130. If failure information of the vehicle is detected or a stop request is received, the processor 130 searches for at least one area where a stop is possible based on the obtained external environment information, determines the oblique stop or the parallel stop based on the size or transverse length information of the searched area where a stop is possible, and controls the traveling of the vehicle such that the vehicle stops according to the determined stop type in the area where a stop is possible.

According to the example, the area where a stop is possible may be positioned on the shoulder of the road.

According to the example, the processor 130 may control the full-shoulder stop or the half-shoulder stop to be performed based on the width information of the shoulder.

According to the example, if the half-shoulder stop is performed, the processor 130 may calculate a transverse length of a vehicle that crosses a general lane (or driving lane). If the calculated transverse length is less than or equal to a predetermined value, the processor 130 can terminate the stop process.

Accordingly, various examples of the present document provide a vehicle that performs a minimal risk maneuver (MRM) to remove (or reduce) the risk if it is detected that normal autonomous driving is impossible during autonomous driving, and an operation method thereof.

Various examples of the present disclosure disclose a device that stops the vehicle on a road shoulder through the minimal risk maneuver if it is detected that normal autonomous driving is impossible during the autonomous driving of the vehicle, and an operation method thereof.

The technical problem to be overcome in this document is not limited to the above-mentioned technical problems. Other technical problems not mentioned can be clearly understood from those described below by a person having ordinary skill in the art.

One example is an autonomous vehicle including: at least one sensor; a controller configured to control operations of the vehicle; and a processor configured to be electrically connected to the at least one sensor and the controller. The processor detects a situation where a road shoulder stop is desired, based on surrounding environment information and vehicle state information collected from the at least one sensor, searches for a road shoulder area where the vehicle is able to stop, by using the at least one sensor, determines a stop type for the road shoulder area, based on a size of the searched road shoulder area, and controls the vehicle to stop in the searched road shoulder area in accordance with the determined stop type, by controlling the controller.

Another example is an operation method of an autonomous vehicle. The operation method includes detecting a situation where a road shoulder stop is desired, based on surrounding environment information and vehicle state information collected from the at least one sensor; searching for a road shoulder area where the vehicle is able to stop, by using the at least one sensor; determining a stop type for the road shoulder area, based on a size of the searched road shoulder area; and controlling the vehicle to stop in the searched road shoulder area in accordance with the determined stop type, by controlling the controller.

According to various examples of the present disclosure, if it is detected that normal autonomous driving is impossible during autonomous driving, it is possible to minimize the risk of the vehicle and to improve the safety of the vehicle by performing a minimal risk maneuver.

As described above, in various examples of the present disclosure, the vehicle unable to perform the normal autonomous driving stops on the shoulder of the road, so that it is possible to minimize the effect on the traffic flow, to minimize the possibility of a secondary collision, and to enable the driver or passenger to evacuate out of the road.

In one or more examples, the above-described functions may be implemented in hardware, software, firmware, or any combination thereof. If implemented in software, the functions may be stored on or transmitted as one or more instructions or codes on a computer-readable medium. The computer readable media includes both a computer storage medium and a communication medium including any medium that facilitates the transfer of a computer program from one place to another. The storage medium may be any available medium that can be accessed by a computer. By way of a non-limiting example, such a computer-readable medium may include RAM, ROM, EEPROM, CD-ROM or other optical disk storage, a magnetic disk storage, or other magnetic storage device, or may include any other medium that can be used to transfer or store a desired program code in the form of instructions or data structures and can be accessed by a computer. Also, any connection is appropriately referred to as a computer-readable medium. For example, if software is transmitted from a website, a server, or other remote sources by using a coaxial cable, an optical fiber cable, twisted pair cables, a digital subscriber line (DSL) or wireless technologies such as infrared ray, radio, and ultra-high frequency, the coaxial cable, optical fiber cable, twisted pair cables, DSL, or the wireless technologies such as infrared ray, radio, and ultra-high frequency are included in the definition of medium. The disk and disc used herein includes a compact disc (CD), a laser disc, an optical disc, a digital versatile disk (DVD), a floppy disk, and a Blu-ray disc. While the disks usually reproduce data magnetically, the discs reproduce data optically by means of a laser beam. The above combinations should also be included within the range of computer-readable medium.

If the examples are implemented in program codes or in code segments, the code segment should be recognized as indicating procedures, functions, subprograms, programs, routines, subroutines, modules, software packages, classes, or instructions, data structures, or program instructions. The code segment may be coupled to other code segments or hardware circuits by passing and/or receiving information, data, arguments, parameters, or memory contents. The information, arguments, parameters, data, etc., can be transferred, sent, or transmitted by using any appropriate means including memory sharing, message passing, token passing, network transmission, and the like. Additionally or alternatively, in some examples, the steps and/or operations of the method or algorithm may be resident as one of the codes and/or instructions or any combination or set of them on a machine-readable medium and/or a computer-readable medium that can be incorporated into a computer program product.

In the implementation of software, the technologies described herein may be implemented in modules (e.g., procedures, functions, etc.) that perform the functions described herein. Software codes may be stored in memory units and executed by processors. The memory unit may be implemented within the processor or external to the processor. In this case, the memory unit may be communicatively connected to the processor by various means as is well known.

In the implementation of hardware, processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions described herein, or combinations thereof.

What has been described above includes examples of one or more examples. It is, of course, not possible to describe every possible combination of components or methods for the purpose of describing the above examples, but those skilled in the art will recognize that many further combinations and permutations of the various examples are possible. Accordingly, the described examples are intended to include all alternatives, modifications and changes within the spirit and scope of the appended claims. Moreover, with regard to a range in which the term "include" is used in the description or claims, such a term is included in a similar manner to "consisting of" interpreted if the term "composed of" is used as a transitional word in claims.

As used herein, the term "infer" or "inference" refers generally to a process of determining or inferring the state of a user, a system, and/or environment from a set of observations captured by an event and/or data. The inference may be used to identify a specific situation or operation, or, for example, may generate a probability distribution of states. The inference may be probabilistic, that is, may be a calculation of the probability distribution of the corresponding states based on the consideration of events and data. The inference may also refer to a technology used to constitute higher-level events from a set of events and/or data. This inference estimates new events or operations from a set of observed events and/or stored event data, whether the events are closely correlated in time, and whether the events and data come from one or several event and data sources.

Moreover, as used in the present disclosure, the terms "component", "module", "system" and the like are not limited thereto but includes a computer-related entity such as hardware, firmware, a combination of hardware and software, software, or running software. that contains entities. For example, the component is not limited thereto but may be a process running on a processor, a processor, an object, an executable thread of execution, a program, and/or a computer. By way of example, both an application running on a processing device and the processing device may be components. One or more components may reside within a process and/or thread of execution, and the component may be localized on one computer and/or may be distributed between two or more computers. Also, these components may be executed from various computer-readable media having various data structures stored thereon. The components may communicate by local and/or remote processes, such as by following signals having one or more data packets (e.g., data from any component interacting with other systems through a network, such as the Internet, by other components and/or signals of a local system and a distributed system.

What is claimed is:

1. A vehicle comprising:

at least one sensor;

a controller configured to control operations of the vehicle; and a processor electrically connected to the at least one sensor and the controller, wherein the processor is configured to:

detect, based on surrounding environment information and vehicle state information collected from the at least one sensor, an event associated with a stop;

identify, based on a sensing result of the at least one sensor and based on the detected event, an area for the vehicle to stop;

determine, based on a length of the identified area not satisfying a threshold length, that an oblique stop corresponds to a stop type; and based on the determination that the oblique stop corresponds to the stop type, cause the controller to control the vehicle to stop in the identified area by controlling the vehicle to drive, with a lane change and without reversing, until making the oblique stop of the vehicle in the identified area.

2. The vehicle of claim 1, wherein:

the stop type corresponds to a combination of:

one of a full-shoulder stop or a half-shoulder stop; and one of a parallel stop or the oblique stop.

3. The vehicle of claim 2, wherein the processor is further configured to:

based on a width of the identified area satisfying a threshold width and the length of the identified area satisfying the threshold length, determine that the full-shoulder stop and the parallel stop correspond to the stop type, based on the width of the identified area not satisfying the threshold width and the length of the identified area not satisfying the threshold length, determine that the half-shoulder stop and the oblique stop correspond to the stop type, based on the width of the identified area not satisfying the threshold width and the length of the identified area satisfying the threshold length, determine that the half-shoulder stop and the parallel stop correspond to the stop type, and based on the width of the identified area satisfying the threshold width and the length of the identified area not satisfying the threshold length, determine that the full-shoulder stop and the oblique stop correspond to the stop type.

4. The vehicle of claim 1, wherein the processor is further configured to:

based on a width of the identified area satisfying a threshold width, determine that a full-shoulder stop corresponds to the stop type, and based on the width of the identified area not satisfying the threshold width, determine that a half-shoulder stop corresponds to the stop type.

5. The vehicle of claim 1, wherein the processor is further configured to:

based on the length of the identified area satisfying the threshold length, determine that a parallel stop corresponds to the stop type.

6. The vehicle of claim 1, wherein the processor is configured to:
identify the area by searching for the area within a specified threshold range.

7. The vehicle of claim 6, wherein the processor is further configured to:
prioritize the searching:
with a first priority, for an area corresponding to a full-shoulder stop and a parallel stop; and
with a second priority, for an area corresponding to a half-shoulder stop, the second priority being lower than the first priority.

8. The vehicle of claim 7, wherein the processor is further configured to:
predict a size of a portion of a driving lane encroached by the vehicle crossing the driving lane for stopping, and
based on the predicted size not satisfying a threshold size, determine that the stop type corresponds to the half-shoulder stop.

9. The vehicle of claim 6, wherein the processor is configured to:
identify the area, based on a prior failed search for a road shoulder area for the vehicle to stop, by searching for the area for the vehicle to make a traffic lane stop.

10. A method performed by at least one processor of a vehicle, the method comprising:
detecting, based on surrounding environment information and vehicle state information collected from at least one sensor, an event associated with a stop;
identifying, based on a sensing result of the at least one sensor and based on the detected event, an area for the vehicle to stop;
determining, based on a length of the identified area not satisfying a threshold length, that an oblique stop corresponds to a stop type; and
causing, based on the determining that the oblique stop corresponds to the stop type, a controller to control the vehicle to stop in the identified area by causing the controller to control the vehicle to drive, with a lane change and without reversing, until making the oblique stop of the vehicle in the identified area.

11. The method of claim 10, wherein the determining the stop type comprises:
determining that the stop type corresponds to a combination of:
one of a full-shoulder stop or a half-shoulder stop; and
one of a parallel stop or the oblique stop.

12. The method of claim 11, wherein the determining the stop type comprises:
based on a width of the identified area satisfying a threshold width and the length of the identified area satisfying the threshold length, determining that the full-shoulder stop and the parallel stop correspond to the stop type;
based on the width of the identified area not satisfying the threshold width and the length of the identified area not satisfying the threshold length, determining that the half-shoulder stop and the oblique stop correspond to the stop type;
based on the width of the identified area not satisfying the threshold width and the length of the identified area satisfying the threshold length, determining that the half-shoulder stop and the parallel stop correspond to the stop type; or based on the width of the identified area satisfying the threshold width and the length of the identified area not satisfying the threshold length, determining that the full-shoulder stop and the oblique stop correspond to the stop type.

13. The method of claim 11, wherein the stop type corresponds to one of a plurality of shoulder-stop types different from lane-stop types, and wherein the determining of the stop type is further based on a type of an identified state of at least one vehicle part of the vehicle.

14. The method of claim 10, wherein the determining the stop type comprises:
based on a width of the identified area satisfying a threshold width, determining that a full-shoulder stop corresponds to the stop type; or
based on the width of the identified area not satisfying the threshold width, determining that a half-shoulder stop corresponds to the stop type.

15. The method of claim 10, wherein the identifying the area comprises searching for the area within a specified threshold range.

16. The method of claim 15, wherein the searching for the area comprises prioritizing the searching:
with a first priority, for an area corresponding to a full-shoulder stop and a parallel stop; and
with a second priority, for an area corresponding to a half-shoulder stop, the second priority being lower than the first priority, and
wherein the searching with the second priority comprises:
predicting a size of a portion of a driving lane encroached by the vehicle crossing the driving lane for stopping; and
based on the predicted size not satisfying a threshold size, determining that the stop type corresponds to the half-shoulder stop.

17. The method of claim 15, wherein the identifying the area comprises identifying the area, based on a prior failed search for a road shoulder area for the vehicle to stop, by searching for the area for the vehicle to make a traffic lane stop.

18. The method of claim 10, wherein making the oblique stop of the vehicle comprises stopping the vehicle obliquely with respect to an outermost lane boundary, without being parallel to the outermost lane boundary, and wherein the length of the identified area corresponds to a length of a line segment, of the identified area, that is parallel to the outermost lane boundary.

19. The method of claim 10, further comprising:
setting a moving path of the vehicle for moving to the identified area, wherein the moving path is set such that an intermediate stop is not performed while moving to the identified area, and
wherein the controlling of the vehicle comprises performing a minimum risk maneuver, with the lane change and without reversing, until making the oblique stop of the vehicle in the identified area.

20. A method performed by at least one processor of a vehicle, the method comprising:
detecting, based on surrounding environment information and vehicle state information collected from at least one sensor, an event associated with a stop;
identifying, based on a sensing result of the at least one sensor and based on the detected event, an area for the vehicle to stop;
determining, based on a size of the identified area, a stop type, wherein the stop type is determined based on a subset of a full-shoulder stop, a half-shoulder stop, a parallel stop, and an oblique stop, wherein the deter-
mining the stop type comprises determining, based on
a length of the identified area not satisfying a threshold
length, that the oblique stop corresponds to the stop
type; and causing, based on the determined stop type being one of
a plurality of shoulder-stop types different from lane-
stop types, a controller to control the vehicle to stop in
the identified area by causing the controller to control
the vehicle to drive, with a lane change and without
reversing, until stopping the vehicle in the identified
area, wherein the determined stop type corresponds to a com-
bination of:
one of the full-shoulder stop or the half-shoulder stop;
and
one of the parallel stop or the oblique stop.

\* \* \* \* \*